United States Patent [19]

Schultz

[11] Patent Number: 4,462,562

[45] Date of Patent: Jul. 31, 1984

[54] SELF-DEPLOYING AFTERBODY APPARATUS FOR AN EJECTION SEAT

[75] Inventor: Edwin R. Schultz, Waynesville, Ohio

[73] Assignee: The United States of America as represented by the Secretary of the Air Force, Washington, D.C.

[21] Appl. No.: 418,117

[22] Filed: Sep. 14, 1982

[51] Int. Cl.³ .............................................. B64D 25/10
[52] U.S. Cl. ................................ 244/122 A; 244/130; 296/1 S
[58] Field of Search ............... 244/122, 121, 139, 140, 244/141, 138 R, 130, 147; 296/1 S

[56] References Cited

U.S. PATENT DOCUMENTS

| | | | |
|---|---|---|---|
| 2,829,850 | 4/1958 | Culver | 244/141 |
| 2,931,598 | 4/1960 | Sanctuary | 244/122 |
| 3,334,847 | 8/1967 | Axenborg | 244/122 |
| 3,432,125 | 3/1969 | Schroeder, Jr. | 244/130 |
| 3,679,157 | 7/1972 | Roberts et al. | 244/141 |
| 4,261,535 | 4/1981 | Swanson | 244/130 |
| 4,319,723 | 3/1982 | Schultz | 244/122 A |

FOREIGN PATENT DOCUMENTS

| | | | |
|---|---|---|---|
| 2437075 | 2/1976 | Fed. Rep. of Germany | 296/1 S |
| 34737 | 12/1964 | Finland | 244/141 |
| 1046093 | 12/1953 | France | 244/122 AF |

Primary Examiner—Galen L. Barefoot
Attorney, Agent, or Firm—Donald J. Singer; John R. Flanagan

[57] ABSTRACT

A self-deploying afterbody apparatus for an ejection seat of an aircraft includes a cover plate, a plurality of arcuate-shaped stiffeners and a fabric skin of material. The cover plate is pivotally mounted at one end to the back side of the ejection seat and the stiffeners are pivotally mounted at their bases to the back side of the seat and share a common pivotal axis with the cover plate. The stiffeners are located between the cover plate and seat, and the fabric skin extends between the cover plate and seat and covers the stiffeners so as to form an expandible and collapsible bellows-like afterbody structure. In the collapsed position, the afterbody structure is folded up and locked against the back of the seat. When the seat ejects, a lanyard attached between the cover plate and aircraft floor pulls the afterbody structure into an expended, operative position. When the afterbody structure is fully extended, the continued ejection of the seat causes the lanyard to detach from the floor or cover plate.

8 Claims, 7 Drawing Figures

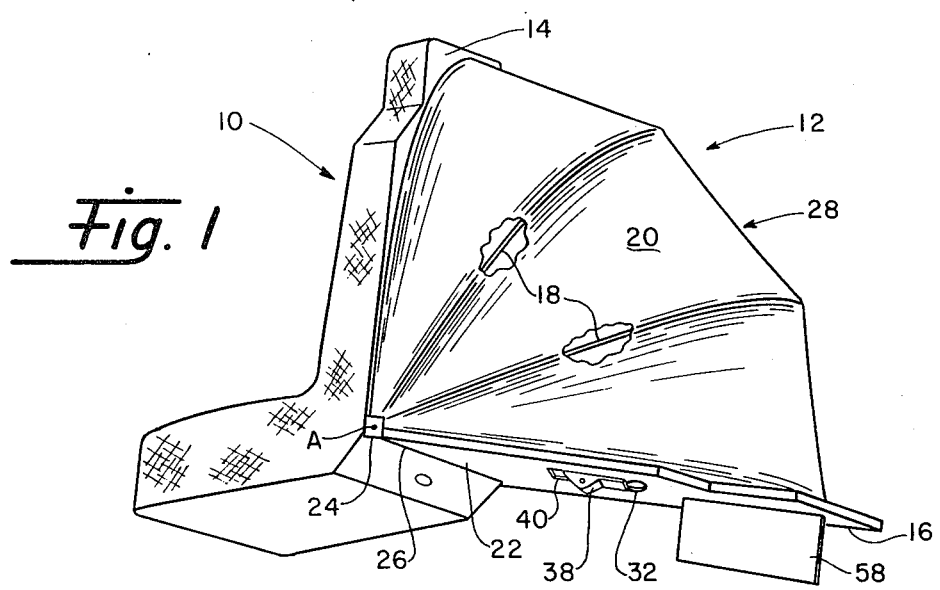
Fig. 1
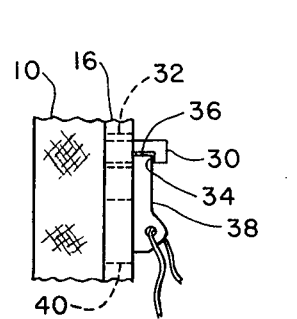
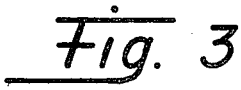
Fig. 2
Fig. 3
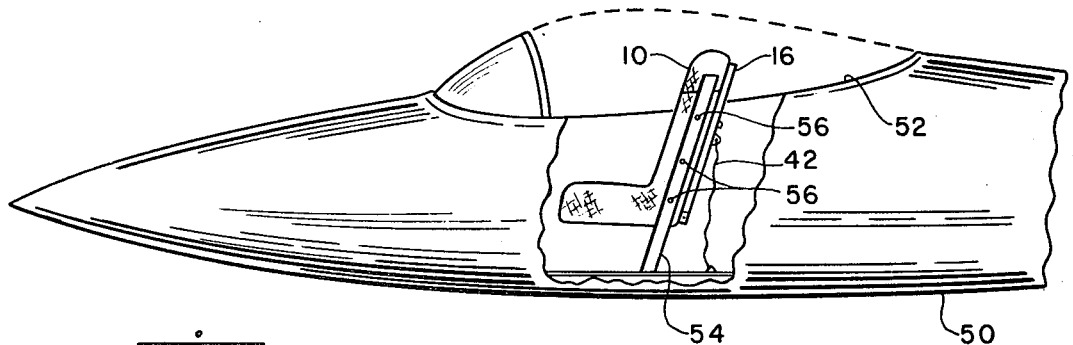
Fig. 4

SELF-DEPLOYING AFTERBODY APPARATUS FOR AN EJECTION SEAT

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to aircraft escape systems and, more particularly, is concerned with a self-deploying afterbody apparatus on an ejection seat for stabilizing the seat and reducing aerodynamic drag thereon following an emergency ejection.

2. Description of the Prior Art

The effect of abrupt deceleration on a crewmember is particularly acute during bail-out from an aircraft flying at supersonic speeds. The inertial forces to which the ejection seat occupant is subjected during the deceleration period immediately following ejection are equivalent to many times the forces of gravity and are often beyond human endurance.

Consequently, over the past few decades a common objective has been to devise an aircraft escape system which appreciably reduces the drag forces imposed upon the seat and its occupant when suddenly thrust into the airstream, thereby producing a much less severe deceleration than heretofore. Several approaches to achieving this objective have appeared in the prior art.

U.S. Pat. No. 2,829,850 to Culver employs a skip-flow generator which is projected in front of the seat to generate an aerodynamic skip-flow around the blunt body of the ejection seat and its occupant. U.S. Pat. No. 2,931,598 to Sanctuary uses rockets on the rear of the seat to force the seat into an optimum low drag attitude by causing tilting of the seat about a transverse axis in a backward direction. Both of these patents disclose additional lateral fin features for stabilizing the seat against both rotation and oscillation (pitch and yaw) after ejection has taken place. However, the approaches of these two patents envision escape systems which are too complex mechanically, making them prone to reliability problems, and add considerable weight to the aircraft.

More recently, ejection seats equipped with afterbodies have been shown through wind tunnel tests and computer simulations to reduce yaw and pitch excursions as well as the longitudinal deceleration experienced by the seat and occupant during high speed emergency escape from the aircraft. U.S. Pat. No. 4,261,535 to Swanson provides an afterbody in the form of a plurality of inflatable air bags on the back of the ejection seat. Gas generators cause the air bags to inflate in sequence from top-to-bottom as the seat and its occupant eject from the aircraft. This produces a rearwardly extending generally streamline afterbody which is said to reduce aerodynamic drag and stabilize the seat with its occupant after emergency ejection.

While the improved aerodynamic characteristics of afterbodies on ejection seats offer the potential for providing a safer environment for the occupant of the seat by reducing the risk of injuries due to limb flail and lateral and/or longitudinal movement of internal organs, certain problems connected with afterbodies must be overcome. A primary constraint in employing afterbodies has been the physical problems in deploying the afterbody from the ejection seat during emergency escape. The afterbody should be in place and effective by the time the last rollers of the seat exit the ejection rails. The afterbody of Swanson fails to overcome this constraint. By the time the seat leaves the aircraft, the upper air bags of the afterbody are fully inflated; however, the lower bags are only partially inflated. Not until after the lower bags are completely filled will the total afterbody stabilize the seat and reduce aerodynamic drag.

Consequently, a need exists for an improved aircraft escape system which is simple in design, reliable in operation and effective when needed, characteristics which are lacking in the prior art systems.

SUMMARY OF THE INVENTION

The present invention provides an improved aircraft escape system designed to satisfy the aforementioned needs. Uniquely, the escape system employs a new concept for an afterbody apparatus which is simple, reliable and structurally efficient. The concept is that the ejection seat afterbody is self-deploying in the sense that it is unlocked and deployed as a result of the physical movement of the seat as the latter exits the aircraft cockpit.

Accordingly, the present invention is directed to a self-deploying stabilizing and drag reducing apparatus for an aircraft ejection seat. The apparatus comrprises a cover plate, a plurality of stiffeners and a fabric skin of material. The cover plate is pivotally mounted at one end to a back side of the ejection seat. The stiffeners are pivotally mounted at their bases to the back side of the seat and located between the cover plate and the seat. The fabric skin extends between the cover plate and seat and covers the stiffeners so as to form an expandible and collapsible bellows-like afterbody structure. In a stowed or collapsed position, the afterbody structure is folded up and locked against the back side of the seat. When the seat ejects, a lanyard or strap, one end of which is attached to the afterbody pivotal cover plate and the other end to the aircraft floor, pulls the bellows-like afterbody structure into an extended, operative position. When the afterbody structure is fully extended, the contained ejection of the seat causes the lanyard to detach, breaking the interconnection of the cover plate to the aircraft floor.

BRIEF DESCRIPTION OF THE DRAWINGS

FIG. 1 is a rear perspective view of the self-deploying afterbody apparatus of the present invention.

FIG. 2 is an enlarged fragmentary rear view of the afterbody apparatus of FIG. 1, showing the means for locking the cover plate against the seat with the afterbody structure in its collapsed position.

FIG. 3 is a fragmentary side elevational view taken along line 3—3 of FIG. 2.

FIG. 4 is a fragmentary side elevational view of the forward portion of an aircraft having an ejection seat employing the afterbody apparatus of FIG. 1, with the ejection seat shown in its normal, static position.

DETAILED DESCRIPTION OF THE INVENTION

Figure 5:
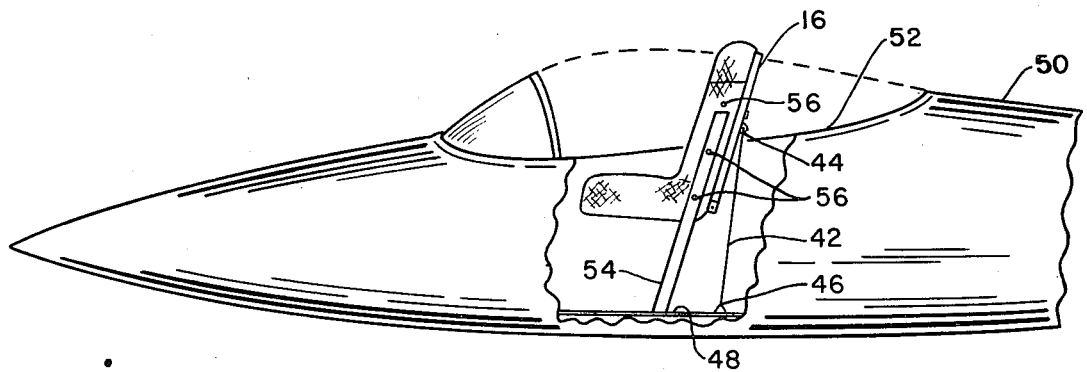
FIG. 5 is a view similar to FIG. 4, but showing the initial upward movement of the seat during ejection which unlocks the afterbody apparatus.

Referring now to the drawings, and more particularly to FIG. 1, there is shown an aircraft ejection seat 10 having the self-deploying afterbody apparatus, generally designated 12, of the present invention mounted on the back side 14 of seat 10. The afterbody apparatus includes a cover plate 16, a plurality of semi-elliptical stiffeners 18, and a fabric skin of material 20. The cover plate 16 is pivotally mounted at one end 22, preferably by a ratchet-type hinge 24, about axis A to the lower edge 26 of the back side 14 of the seat 10. The plurality of stiffeners 18 are pivotally mounted at their bases to the back side of the seat about the pivotal axis A and located between the cover plate 16 and back side 14 of the seat 10. The fabric skin 20, composed of a strong, flexible material such as Kevlar, extends between and interconnects the cover plate 16 and seat 10, and covers the stiffeners so as to form an expandible and collapsible bellows-like, semi-elliptical cross-section shaped, afterbody structure, generally designated 28, which reduces aerodynamic drag forces on said seat and thereby stabilizes the same following ejection from an aircraft.

In a stowed or collapsed position, the afterbody structure 28 is folded up and locked against the back side 14 of the seat 10. As shown in greater detail in FIGS. 2 and 3, means for locking the afterbody structure 28 against the seat 10 includes a pin 30 which is fixed to the back side 14 of the seat 10 and extends rearwardly therefrom in alignment with a hole 32 formed in the cover plate 16. When the cover plate 16 is pivoted up against the seat back side 14, with the afterbody structure 28 in its collapsed position, the outer end of the pin 30 extends through the hole 32 and has a downwardly-opened notch 34 exposed to receive the terminus 36 of an upwardly-biased latch 38, slidably mounted in a slot 40 defined in the cover plate 16.

The afterbody apparatus 12 further includes means for causing deployment of the bellows-like afterbody structure 28 during ejection of the seat 10. Such means takes the form of a lanyard or strap 42 which at one end 44 is attached to the afterbody pivotal cover plate 16 via the latch 38 and at the other end 46 to a stationary location on the aircraft floor 48, such as by a shear bolt (not shown). The lanyard 42 is of such length that it is drawn taut as the seat 10 is ejected causing the afterbody structure 28 to begin deploying but detaches or fails when the afterbody structure 28 is fully deployed as the ejection seat 10 clears the cockpit 50 of the aircraft 52. The hinge 24, which pivotally connects the cover plate 16 to the back side 14 of the ejection seat 10, in its normal use only allows movement of the afterbody structure 28 from the collapsed position (FIG. 3) adjacent the back side 14 of the seat 10 toward an expanded position (FIG. 7) in which it extends outwardly from the seat 10.

Figure 6:
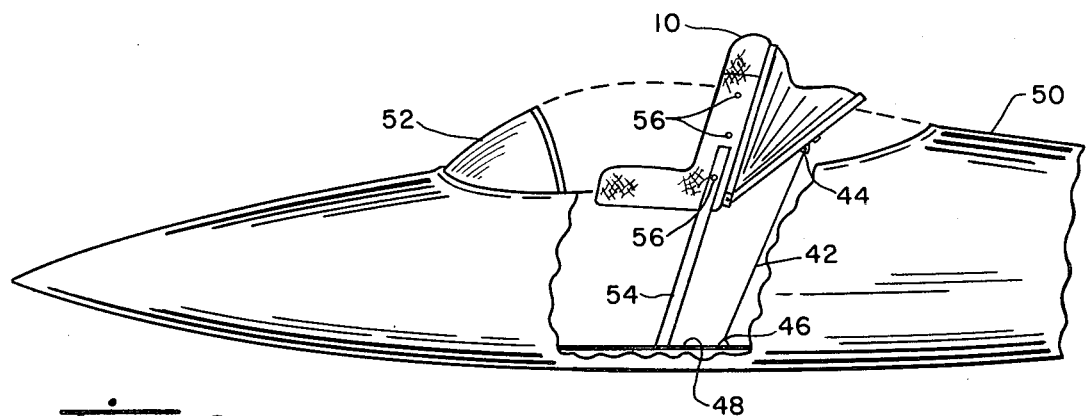
FIG. 6 is a view similar to FIG. 5, but showing the initiation of deployment of the afterbody apparatus as ejection of the seat continues.
Figure 7:
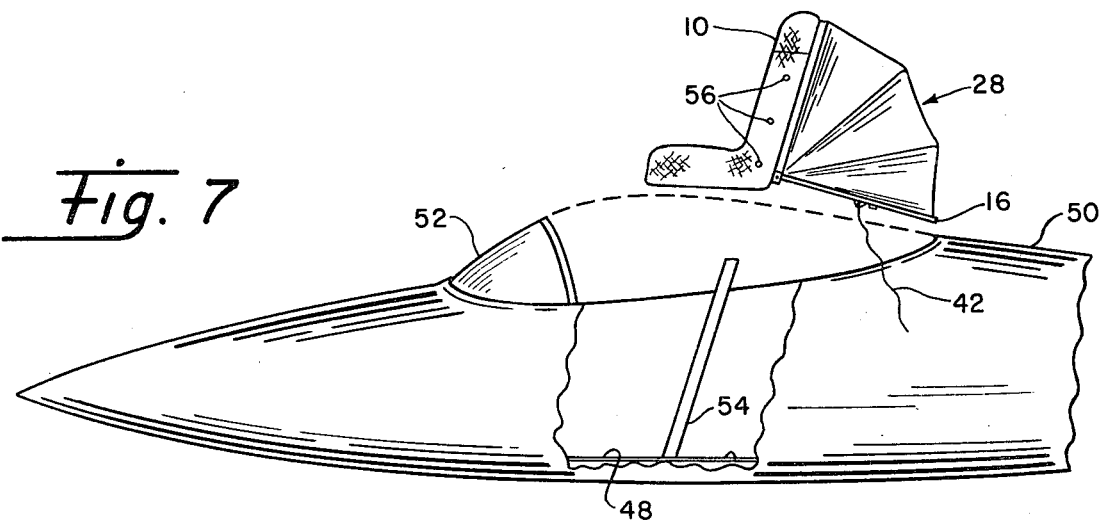
FIG. 7 is a view similar to FIG. 6, but showing the full deployment of the afterbody apparatus as the ejection seat clears the aircraft cockpit.

FIG. 4 shows the relative static positions of the ejection seat 10 and afterbody apparatus 12 during normal non-emergency periods of use. FIGS. 5 through 7 show their relative positions during ejection of the seat 10 in an emergency situation. In FIG. 5, a suitable mechanism (not shown) operatively connected to the seat 10 has initiated a catapult operation for ejecting the seat 10 from the aircraft 50. When the catapult mechanism is fired, the ejection seat 10 moves up the generally vertical ejection rails 54 disposed at opposite lateral sides of the seat. The lanyard 42 ia drawn taut, as seen in FIG. 5, which causes the slidable latch 38 to move downward and unlock or release the locking pin 30. Thus, as ejection of seat 10 continues, as progressively illustrated in FIGS. 5 and 6, the lanyard 42 applies a downward force on the unlocked afterbody cover plate 16 which initiates downward pivoting of the same and deployment of the afterbody structure 28. The hinge 24 is a ratchet-type device which allows only downward rotation of the cover plate 16. As the ejection seat 10 clears the cockpit area 52, the lanyard 42 pulls the afterbody structure 28 down to its fully deployed or expanded position. Then a shear bolt (not shown) connecting the lanyard 42 to the floor 48 fails, detaching the lanyard from the aircraft 50 with the seat 10 continuing its escape trajectory, as seen in FIG. 7.

Therefore, the lanyard 42 provides a simple linear device to ensure that the deployment of the afterbody structure 28 occurs as near to the cockpit 52 as possible, independent of the timing and performance of the catapult mechanism for ejecting the seat. The vertical acceleration of the seat 10 under catapult operation provides forces that are in the correct direction to assist in the deployment of the afterbody structure 28. The afterbody structure 28 will be in place and effective by the time the last of rollers 56 on the lateral side of the seat 10 exit the ejection rails 54.

Also, in FIG. 1, there is shown an optional vertical tail 58 which may be added for enhanced aerodynamic stability in some instances. The arcuate-shaped or semi-elliptical stiffeners attached to the inside of the fabric skin 20 will provide the afterbody structure 28 with the desired aerodynamic shape when it is in its deployed or expanded position, as seen in FIGS. 1 and 7. The simplicity and positive self-deployment characteristic of the afterbody apparatus 12 enhances its potential as a reliable means for providing improved aerodynamic characteristics and a reduction in drag for ejection seats.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A self-deploying afterbody apparatus for an ejection seat of an aircraft, comprising:
    (a) a cover plate pivotally mounted at one end to a back side of said ajection seat;
    (b) a plurality of semi-elliptical stiffeners pivotally mounted at their bases to said back side of said seat and located between said cover plate and seat;
    (c) a skin of material extending between and interconnecting said cover plate and seat, and covering said semi-elliptical stiffeners so as to form, upon movement of said plate, an expandible and collapsible, semi-elliptical cross-sectional shaped afterbody structure which reduces aerodynamic drag forces on said seat and thereby stabilizes the same following ejection from an aircraft; and (d) means for causing movement of said plate and thereby deployment of said bellows-like structure during ejection of said seat.

2. The self-deploying afterbody apparatus as recited in claim 1, wherein said afterbody sturucture is normally disposed in a collapsed position in which it is stowed against said back side of said seat.

3. The self-deploying afterbody apparatus as recited in claim 2, wherein said afterbody structure in said collapsed position is folded up against said back side of said seat, with said cover plate disposed against said seat back side.

4. The self-deploying afterbody apparatus as recited in claim 3, wherein, due to pivotal movement of said cover plate away from said seat back side, said afterbody structure is pivotally moved away from said back side of said seat and unfolded into an expanded position in which it extends outwardly from said back side of said seat during ejection of said seat.

5. The self-deploying afterbody apparatus as recited in claim 1, wherein said means for causing deployment of said afterbody structure includes a strap interconnecting said cover plate and a stationary attachment location on said aircraft.

6. The self-deploying apparatus as recited in claim 5, wherein said strap is of such length that it is drawn taut as said seat is ejected causing said afterbody structure to begin deploying, and fails when said afterbody structure is fully deployed and as said ejecting seat clears the cockpit of said aircraft.

7. The self-deploying afterbody apparatus as recited in claim 1, wherein said means for causing deployment of said afterbody structure includes a hinge pivotally connecting said cover plate and said seat which in normal use only allows movement of said afterbody structure from a collapsed position adjacent said back side of said seat toward an expanded position in which it extends outwardly from said seat.

8. The self-deploying afterbody apparatus as recited in claim 1, wherein said cover plate and said stiffeners are all pivotally mounted to said back side of said seat about a common pivotal axis.

* * * * *